(12) United States Patent
Sadakane et al.

(10) Patent No.: US 12,285,927 B2
(45) Date of Patent: Apr. 29, 2025

(54) LAMINATED GLASS

(71) Applicant: AGC Inc., Tokyo (JP)

(72) Inventors: Shunsuke Sadakane, Tokyo (JP); Hideaki Hayashi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/467,083

(22) Filed: Sep. 3, 2021

(65) Prior Publication Data

US 2021/0394488 A1 Dec. 23, 2021

Related U.S. Application Data

(63) Continuation of application No. PCT/JP2020/004747, filed on Feb. 7, 2020.

(30) Foreign Application Priority Data

Mar. 13, 2019 (JP) .................. 2019-046106

(51) Int. Cl.
*B32B 17/10* (2006.01)

(52) U.S. Cl.
CPC ........ *B32B 17/10036* (2013.01); *B32B 17/10* (2013.01); *B32B 17/10467* (2013.01);
(Continued)

(58) Field of Classification Search
CPC .............. B32B 17/10036; B32B 17/10; B32B 17/10467; B32B 17/10541;
(Continued)

(56) References Cited

U.S. PATENT DOCUMENTS

2006/0210776 A1\* 9/2006 Lu .................... B32B 17/10568
428/524
2011/0025584 A1 2/2011 Nishigasako et al.
(Continued)

FOREIGN PATENT DOCUMENTS

CN 102471151 A 5/2012
CN 202503691 U 10/2012
(Continued)

OTHER PUBLICATIONS

International Searching Authority, "International Search Report," issued in connection with International Patent Application No. PCT/JP2020/004747, dated Mar. 31, 2020.
(Continued)

*Primary Examiner* — Megha M Gaitonde
(74) *Attorney, Agent, or Firm* — Foley & Lardner LLP

(57) ABSTRACT

Laminated glass for a vehicle includes a vehicle-interior side glass plate, a vehicle-exterior side glass plate, an interlayer film that bonds the vehicle-interior side glass plate and the vehicle-exterior side glass plate, and a structure sealed in the interlayer film. The interlayer film includes a first interlayer film bonded to the vehicle-interior side glass plate, a second interlayer film bonded to the vehicle-exterior side glass plate, and a third interlayer film located between the first interlayer film and the second interlayer film to enclose an outer periphery of the structure. Where a film thickness of the first interlayer film or the second interlayer film, whichever is thinner, is denoted as ti, and a thickness of the structure is denoted as ts, $ti/ts \geq 0.4$ is satisfied. Where a flexural modulus of the structure is denoted as $E_1$ [MPa], a relationship between ts and $E_1$ satisfies $E_1 \times ts^3 \geq 500$.

16 Claims, 9 Drawing Sheets

(52) U.S. Cl.
CPC .. *B32B 17/10541* (2013.01); *B32B 17/10761* (2013.01); *B32B 2307/546* (2013.01); *B32B 2307/732* (2013.01); *B32B 2605/006* (2013.01)

(58) Field of Classification Search
CPC ........ B32B 17/10761; B32B 2307/546; B32B 2307/732; B32B 2605/006; Y10T 428/24752; Y10T 428/2495; Y10T 428/24959; Y10T 428/24967
USPC .................... 428/189, 212, 213, 214, 215
See application file for complete search history.

(56) References Cited

U.S. PATENT DOCUMENTS

| | | | |
|---|---|---|---|
| 2015/0343744 A1 | 12/2015 | Ogawa et al. | |
| 2016/0159282 A1 | 6/2016 | Kurihara | |
| 2020/0220115 A1* | 7/2020 | Miyoshi | H10K 50/854 |

FOREIGN PATENT DOCUMENTS

| | | | | |
|---|---|---|---|---|
| CN | 202806307 U | | 3/2013 | |
| JP | H05-16450 U | | 3/1993 | |
| JP | 2009-534246 A | | 9/2009 | |
| JP | 2015-000821 A | | 1/2015 | |
| JP | 2018-084905 A | | 5/2018 | |
| JP | 2018170497 A | * | 11/2018 | ........... H05K 1/0266 |
| WO | WO-2007/122427 A1 | | 11/2007 | |
| WO | WO-2014/122704 A1 | | 8/2014 | |
| WO | WO-2015/041106 A1 | | 3/2015 | |
| WO | WO-2017/155066 A1 | | 9/2017 | |
| WO | WO-2019004061 A1 | * | 1/2019 | ......... H01L 51/0097 |

OTHER PUBLICATIONS

International Searching Authority, "Written Opinion," issued in connection with International Patent Application No. PCT/JP2020/004747, dated Mar. 31, 2020.

* cited by examiner

25A

25B

25C

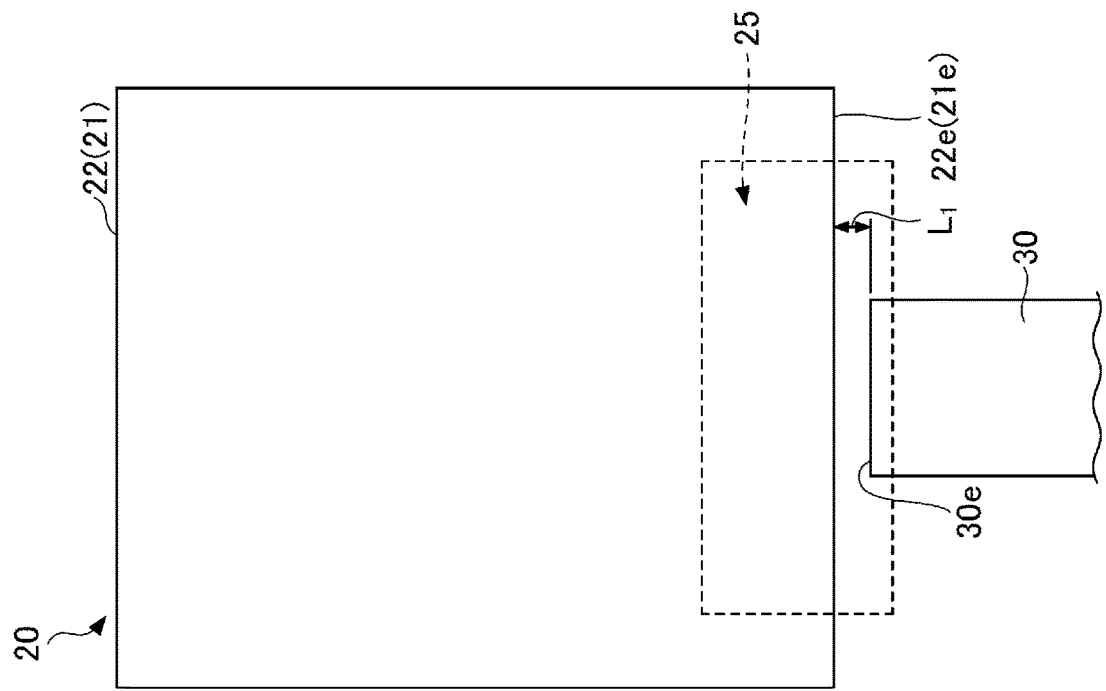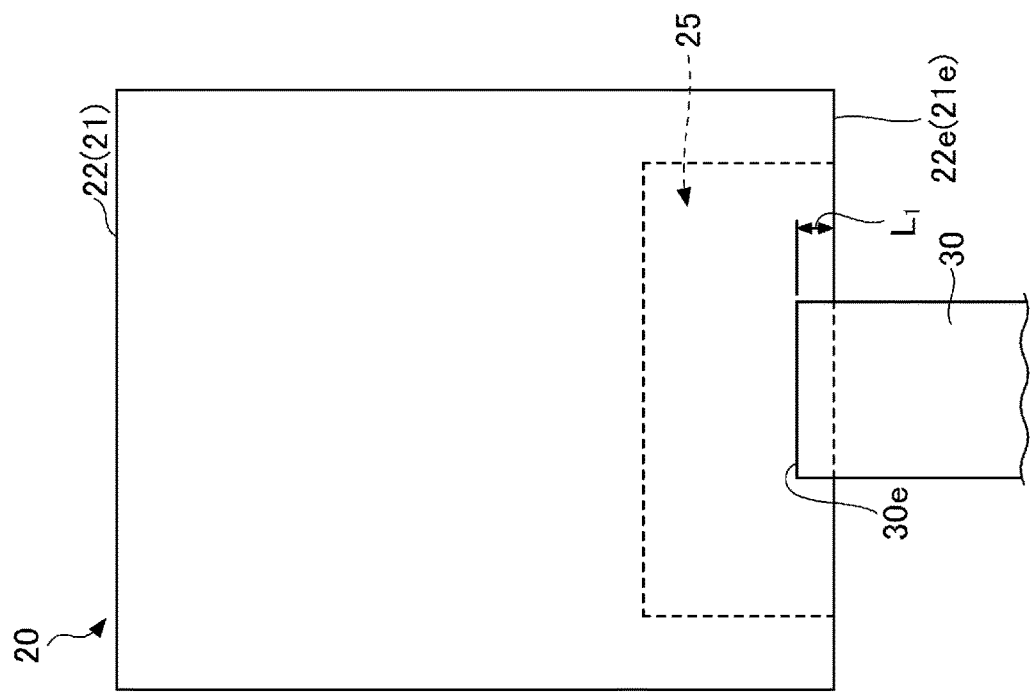

LAMINATED GLASS

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/004747 filed on Feb. 7, 2020 and designating the U.S., which claims priority to Japanese Patent Application No. 2019-046106 filed on Mar. 13, 2019. The entire contents of the foregoing applications are incorporated herein by reference.

BACKGROUND OF THE INVENTION

1. Field of the Invention

The present invention relates to laminated glass.

2. Description of the Related Art

A technique for sealing a structure such as a display device into laminated glass is known. Examples include laminated glass used as a windshield with a flat panel display and the like sealed in its peripheral edge area (for example, see PTL 1) and a liquid crystal display sealed in a display area of a head-up display (for example, see PTL 2).

CITATION LIST

Patent Literature

[PTL 1] International Publication. No. 2015/041106
[PTL 2] Publication of Japanese Translation of PCT Application No. 2009-534246

SUMMARY OF THE INVENTION

Technical Problem

However, the inventors have found out that, in a case where laminated glass has a structure such as a display device and the like, lack of deaeration may occur, or the structure or a glass plate may break, when a film thickness and the like of an interlayer film covering the structure is not appropriate.

The present invention has been made in view of the above problems, and it is an object of the present invention to substantially prevent lack of deaeration, breakage of the structure, and the like, in laminated glass having the structure such as a display device.

Solution to Problem

A laminated glass for a vehicle includes a vehicle-interior side glass plate, a vehicle-exterior side glass plate, an interlayer film that bonds the vehicle-interior side glass plate and the vehicle-exterior side glass plate, and a structure sealed in the interlayer film, wherein the interlayer film includes a first interlayer film bonded to the vehicle-interior side glass plate, a second interlayer film bonded to the vehicle-exterior side glass plate, and a third interlayer film located between the first interlayer film and the second interlayer film to enclose an outer periphery of the structure, wherein where a film thickness of the first interlayer film or the second interlayer film, whichever is thinner, is denoted as $t_i$, and a thickness of the structure is denoted as $t_s$, $t_i/t_s \geq 0.4$ is satisfied, and wherein where a flexural modulus of the structure is denoted as $E_1$ [MPa], a relationship between $t_s$ and $E_1$ satisfies $E_1 \times t_s^3 \geq 500$.

Advantageous Effects of Invention

According to an embodiment of the disclosure, lack of deaeration, breakage of a structure, and the like are substantially prevented in laminated glass having the structure such as a display device.

BRIEF DESCRIPTION OF THE DRAWINGS

FIGS. 4A and 4B are drawings for explaining a distance between a connection end portion, i.e., an end portion of a wiring plate electrically connected to the display device, and an end portion of a glass plate.

DETAILED DESCRIPTION OF THE PREFERRED EMBODIMENTS

Figure 1A:
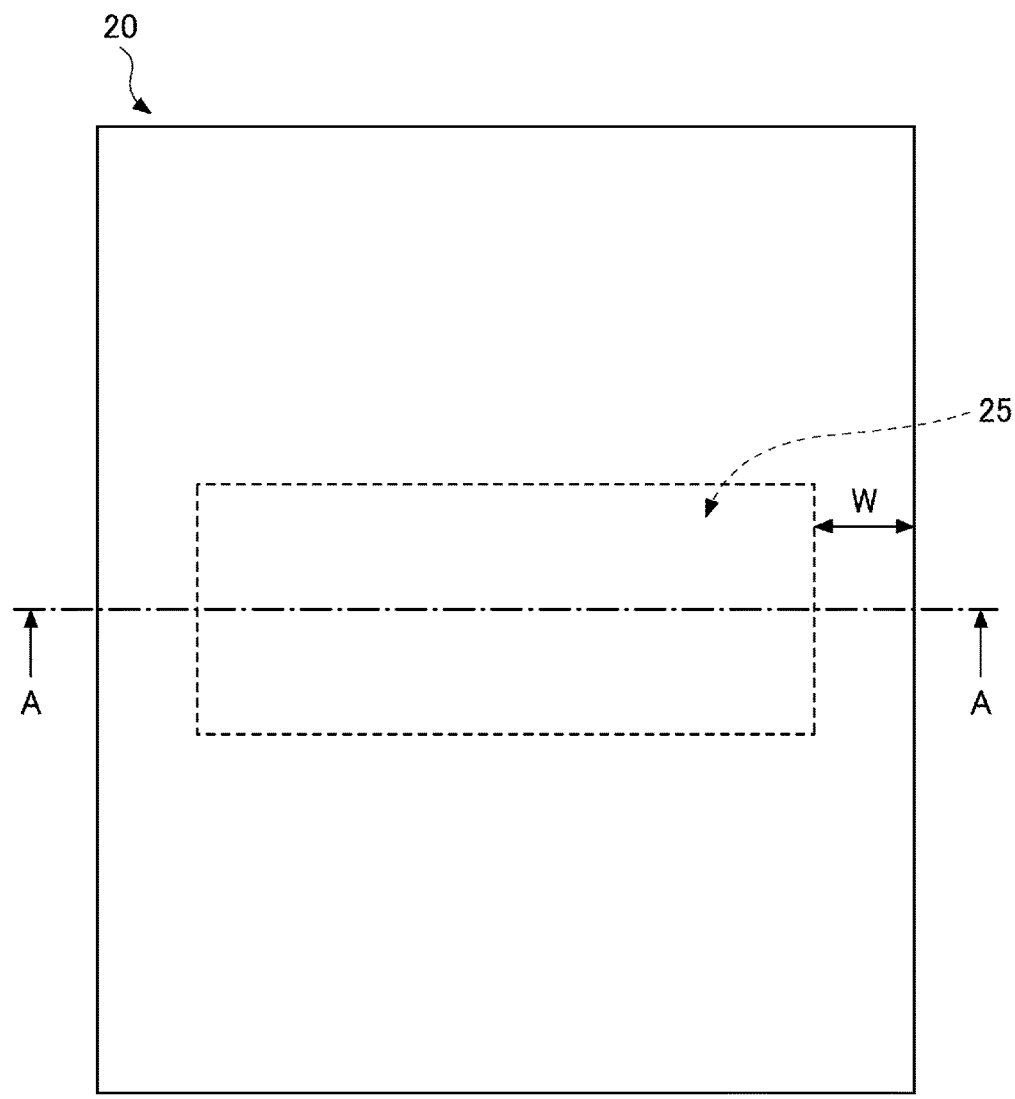
FIGS. 1A and 1B are drawings illustrating laminated glass according to the present embodiment.

Hereinafter, modes for carrying out the invention will be described with reference to the drawings. In drawings, the same constituent elements may be denoted by the same reference numerals and duplicate explanation thereabout may be omitted. Also, in the drawings, the size and shape may be partially exaggerated for facilitating the understanding of the present invention.

It is to be understood that a vehicle is typically an automobile, but is considered to refer to a moving body with glass such as trains, ships, and aircraft.

Also, it is understood that a plan view means seeing a predetermined area of laminated glass from a direction normal to the inner surface of the laminated glass, and a planar shape refers to a shape of a predetermined area of laminated glass as seen from a direction normal to a vehicle-interior side surface of the laminated glass.

Figure 1B:
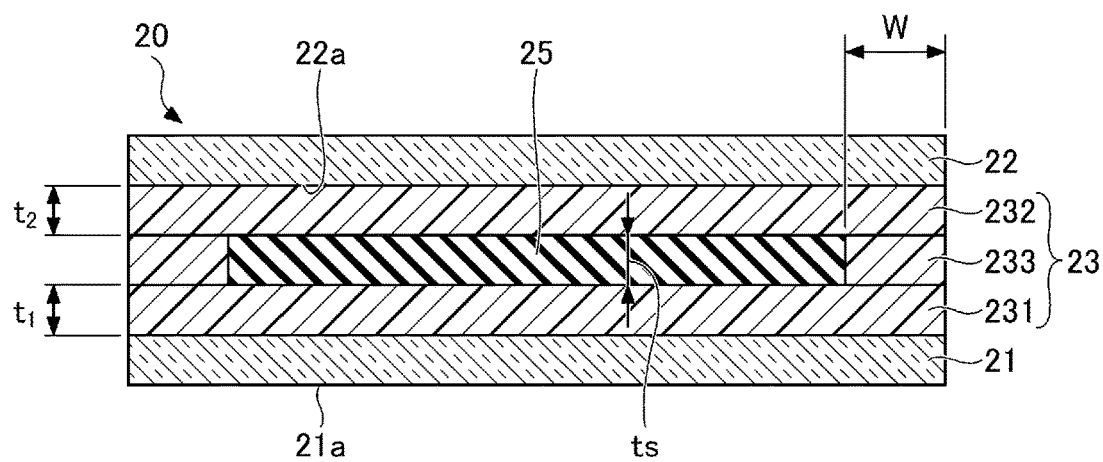

FIGS. 1A and 1B are drawings illustrating examples of laminated glass according to the present embodiment. FIG. 1A schematically illustrates laminated glass attached to a vehicle, as seen from the inside of the passenger compartment toward the outside of the passenger compartment. FIG. 1B is a cross-sectional view taken along line A-A of FIG. 1A.

As illustrated in FIGS. 1A and 1B, the laminated glass 20 is laminated glass for a vehicle, including a glass plate 21, a glass plate 22, an interlayer film 23, and a display device 25. The interlayer film 23 includes, for example, an interlayer film 231 bonded to the glass plate 21, an interlayer film 232 bonded to the glass plate 22, and an interlayer film 233 located between the interlayer film 231 and the interlayer film 232 to enclose a periphery of the display device 25. In a case where it is not necessary to particularly distinguish the interlayer films 231, 232, and 233 from each other, the interlayer films 231, 232, and 233 are simply referred to as the interlayer film 23.

In FIGS. 1A and 1B, the laminated glass 20 is illustrated in a planar manner, but the laminated glass 20 may be in a curved shape. Also, in FIGS. 1A and 1B, the laminated glass 20 is in a rectangular shape, but the planar shape of the laminated glass 20 is not limited to a rectangular shape, and may be in any shape such as a trapezoidal shape. The laminated glass 20 is used as window glass for a vehicle. Examples of window glass for a vehicle includes a windshield, rear window glass, side window glass, roof glass, and the like, for vehicles.

The glass plate 21 is a vehicle-interior side glass plate that is situated on the interior side of the vehicle when the laminated glass 20 is attached to the vehicle. The glass plate 22 is a vehicle-exterior side glass plate that is on the exterior side of the vehicle when the laminated glass 20 is attached to the vehicle. The glass plates 21 and 22 may have predetermined curvatures.

The glass plate 21 and the glass plate 22 constitute a pair of glass plates that face each other. The interlayer film 23 and the display device 25 are located between the pair of glass plates. The glass plate 21 and the glass plate 22 are fixed in such a way that the interlayer film 23 and the display device 25 are sandwiched therebetween. The glass plate 21, the glass plate 22, and the interlayer film 23 are explained later in detail.

For example, a shielding layer may be provided as a belt shape in a peripheral edge area of the laminated glass 20. For example, the shielding layer can be formed by applying and firing ceramic color paste including meltable glass frit including black pigment, but is not limited thereto. The shielding layer may be formed by applying and drying organic ink including black or dark pigment. For example, the shielding layer may be provided on a vehicle-interior side surface 21a of the glass plate 21. However, as necessary, the shielding layer may be provided on a vehicle-interior side surface 22a of the glass plate 22, or may be provided on both of the vehicle-interior side surface 21a of the glass plate 21 and the vehicle-interior side surface 22a of the glass plate 22.

With the opaque shielding layer provided in the peripheral edge area of the laminated glass 20, resin such as urethane for holding the peripheral edge area of the laminated glass 20 on the vehicle body can be prevented or inhibited from being damaged by ultraviolet rays. In addition, a wiring plate (for example, a flexible printed circuit board) and the like electrically connected to the display device 25 can be shielded.

The display device 25 is an example of a structure sealed in the interlayer film 23. The surface of the display device 25 on the side of the glass plate 21 is covered with the interlayer film 231, and the surface of the display device 25 on the side of the glass plate 22 is covered with the interlayer film 232. Also, the outer periphery (the side surface) of the display device 25 is covered with the interlayer film 233 in a picture frame shape.

The width W of the interlayer film 233 (i.e., the width of the picture frame) is preferably equal to or greater than 5 mm, more preferably equal to or greater than 10 mm, and still more preferably equal to or greater than 20 mm. When the width W of the interlayer film 233 is equal to or greater than 5 mm, the display device 25 can be sufficiently protected, and as it is increased to 10 mm or greater and 20 mm or greater, the effect of protecting the display device 25 can be further enhanced. Also, the stress change of the glass plates 21 and 22 around the display device 25 is not applied to the edges of the glass plates 21 and 22 that are relatively weaker than the interior side thereof, so that the glass plates 21 and 22 are substantially prevented from breaking.

The end portion of the display device 25 and the end portion of the glass plates 21 and 22 do not have to be parallel to each other. In a case where the end portion of the display device 25 and the end portion of the glass plates 21 and 22 are not parallel to each other, the width W of the interlayer film 233 (i.e., the width of the picture frame) means the width of the narrowest portion of the picture frame.

The outer periphery of the interlayer film 23 is preferably treated in an edge treatment. In other words, the end portion (the edge) of the interlayer film 23 is preferably treated so that it does not greatly protrude from the end portion (the edge) of the glass plates 21 and 22. The amount of protrusion of the end portion of the interlayer film 23 with respect to the end portion of the glass plates 21 and 22 is preferably equal to or less than 150 μm, so as not to detract from the appearance. However, in a case where the laminated glass 20 is a side window glass, the bottom side is shielded by a door panel, and thus it is not necessary to apply edge treatment to the bottom side of the interlayer film 23.

The display device 25 is a panel-shaped apparatus that displays information such as images and characters. The "information" referred to herein is not particularly limited, and is, for example, guidance on the scenery outside the vehicle, road traffic information, route guidance, advertisements, or the like.

The type of the display device 25 is not particularly limited, and is, for example, a liquid crystal display, an organic electro-luminescence (EL) display, an inorganic electro-luminescence (inorganic EL) display, an (light-emitting diode (LED) display, or the like. For example, the display device 25 includes a substrate made of glass or plastics and a display device (a liquid crystal display device, an organic EL display device, an inorganic EL display device, an LED device, and the like). As necessary, the display device 25 may include constituent elements other than the substrate and the display device (a protective layer and the like covering the display device). Each constituent element of the display device 25 may be made of a transparent material so that the outside can be seen. However, the display device may be of a reflective type. When the laminated glass 20 according to the present embodiment is attached to a vehicle, the direction in which the display device 25 displays information about images and characters may be toward the vehicle-interior side or the vehicle-exterior side.

As necessary, the display device 25 may be arranged substantially in the entirety of the laminated glass 20, or may be arranged in a portion thereof. For example, the planar shape of the display device 25 is a rectangular shape that is smaller than the planar shape of the laminated glass 20. For example, a thickness is of the display device 25 is, for example, equal to or greater than 0.1 mm and equal to or smaller than 3 mm.

Where the film thickness t1 of the interlayer film 231 and the film thickness t2 of the interlayer film 232, whichever is thinner, is denoted as ti, and the thickness of the display device 25 is denoted as ts, the laminated glass 20 satisfies the following expression.

$$ti/ts \geq 0.4 \quad (1)$$

Specifically, in the laminated glass 20, the film thickness ti of the interlayer film 231 or 232, whichever is thinner, is equal to or greater than 0.4 times the thickness ts of the display device 25.

When the expression (1) is satisfied, the cushioning properties of the interlayer films 231 and 232 are improved. In order to obtain the laminated glass 20 according to the present invention, although the details are explained later, a laminated body obtained by stacking, in order the following order, the glass plate 21, the interlayer film 231, the display device 25, the interlayer film 233, the interlayer film 232, and the glass plate 22 is prepared, and for example, the laminated body is put in a rubber bag or the like. The laminated body is pre-bonded while the rubber bag is evacuated (degassed). This pre-bonded laminated body is placed in an autoclave, and heated and pressurized to be adhered (bonded).

In the present invention, when the expression (1) is satisfied, the cushioning properties of the interlayer films 231 and 232 are improved. Therefore, in the step of producing the laminated glass 20, lack of deaeration can be substantially prevented (i.e., exhaustibility of residual air can be improved) and breakage of the glass plates and 22 and the display device 25 can be substantially prevented. As a result, the laminated glass 20 can be achieved with a high quality.

Figure 9:
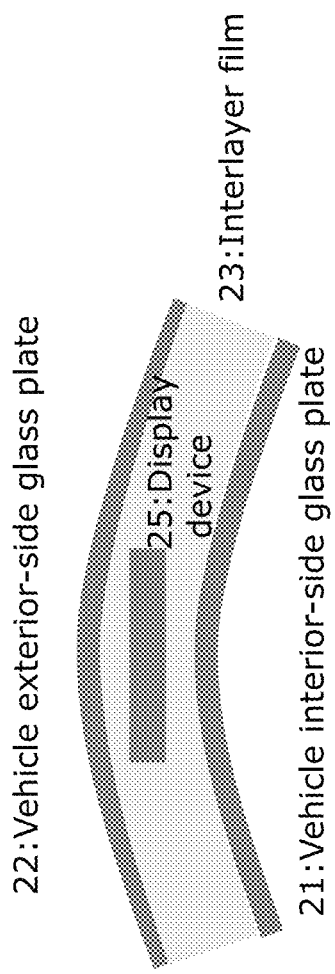
FIG. 9 is a cross-sectional view showing bent shapes of glass plates 21 and 22 and display device 25 being different.

In particular, in a case where bent shapes of the glass plates 21 and 22 and the display device 25 are different (see FIG. 9), e.g., the non-curved display device 25 is sandwiched between the curved glass plates 21 and 22, significant effects are achieved in relation to prevention of the lack of deaeration and prevention of breakage of the glass plates 21 and 22 and the display device 25.

Also, the film thickness ti of the interlayer film 231 or 232, whichever is thinner, with respect to the thickness ts of the display device 25 preferably satisfies the following expression.

$$ti/ts \geq 0.6 \quad (2)$$

In other words, the film thickness ti of the interlayer film 231 or 232, whichever is thinner, is more preferably equal to or greater than 0.6 times the thickness ts of the display device 25.

When the expression (2) is satisfied, the cushioning properties of the interlayer films 231 and 232 are further improved. Therefore, the above effects of substantially preventing the lack of deaeration and substantially preventing breakage of the glass plates 21 and 22 and the display device 25 can be further improved.

Also, in a case where a highly rigid display device 25 of which the relationship between ts and $E_1$ satisfies $E_1 \times ts^3 \geq 500$ is sealed in the interlayer film 23, where the thickness of the display device 25 is denoted as ts [mm] and the flexural modulus is denoted as $E_1$ [MPa], it is effective to satisfy the expression (1) and it is more effective to satisfy the expression (2) in order to substantially prevent the lack of deaeration and substantially prevent breakage of the glass plates 21 and 22 and the display device 25.

Also, in a case where a more highly rigid display device 25 of which the relationship between ts and $E_1$ satisfies $E_1 \times ts^3 \geq 1000$ is sealed in the interlayer film 23, it is particularly effective to satisfy the expression (2) in order to substantially prevent the lack of deaeration and substantially prevent breakage of the glass plates 21 and 22 and the display device 25. For example, in a case where the rigidity of the display device 25 is relatively low, e.g., the display device 25 includes a plastic substrate, it is sufficient to satisfy the expression (1). Conversely, in a case where the rigidity of the display device 25 is relatively high, e.g., the display device 25 includes a glass substrate, it is effective to satisfy the expression (2).

In other words, in a case where the display device 25 is made of a plastic substrate, and the flexural modulus of the display device 25 is equal to or greater than 100 MPa, the laminated glass 20 according to the present invention can achieve a structure for substantially preventing the lack of deaeration and substantially preventing breakage of the glass plates 21 and 22 and the display device 25, with the configuration of the laminated glass 20 according to the present invention satisfying the expression (1).

Also, in a case where the display device 25 is constituted by a substrate made of polycarbonate or the like, and the flexural modulus of the display device 25 is equal to or greater than 1 GPa, or in a case where the display device 25 is made of a glass substrate and the flexural modulus of the display device 25 is equal to or greater than 10 GPa, the laminated glass 20 according to the present invention can achieve a structure for substantially preventing the lack of deaeration and substantially preventing breakage of the glass plates 21 and 22 and the display device 25, with the configuration of the laminated glass 20 according to the present invention satisfying the expression (2).

The flexural modulus $E_1$ in the present application can be measured according to a method based on "ASTM D790".

Figure 2A:
FIGS. 2A to 2C are cross-sectional views illustrating thicknesses of display devices.
Figure 2B:
Figure 2C:
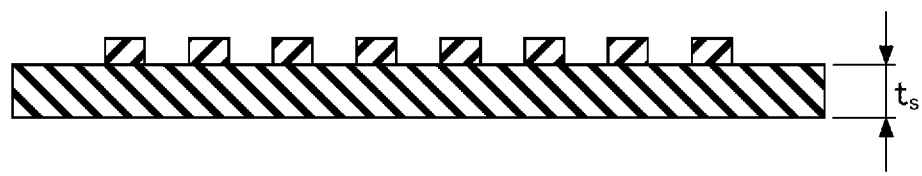

Although the display device 25 may be in various shapes, the thickness ts of the display device 25 is an average thickness of a portion not including a protruding portion as illustrated in FIGS. 2A to 2C.

For example, in a case where multiple layers of different sizes are stacked as in a display device 25A illustrated in FIG. 2A, the thickness ts is an average thickness of the total thickness of the layers included in the display device 25A. In a case where multiple layers of the same size are stacked as in a display device 25B illustrated in FIG. 2B, the thickness ts is an average thickness of the total thickness of the layers included in the display device 25B. In a case where there are protruding portions as in a display device 25C illustrated in FIG. 2C, the thickness ts is an average thickness of portions excluding the protruding portions of the display device 25C. For example, the protruding portions are surface-mount LEDs or the like.

Figure 3A:
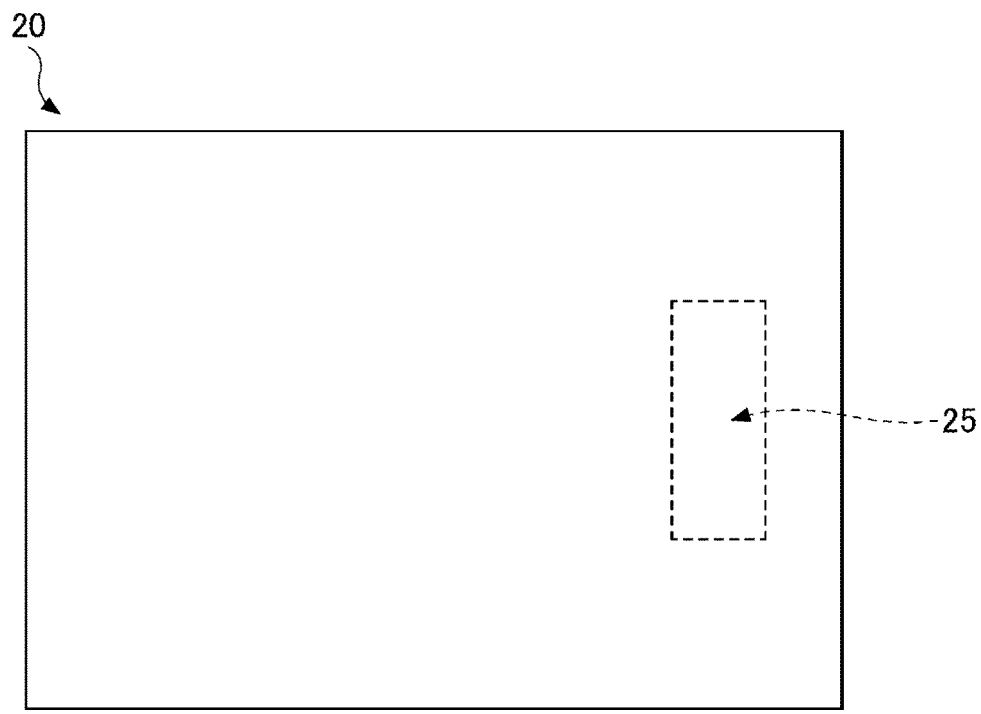
FIGS. 3A and 3B are drawings for explaining preferable arrangements of the display device.
Figure 3B:
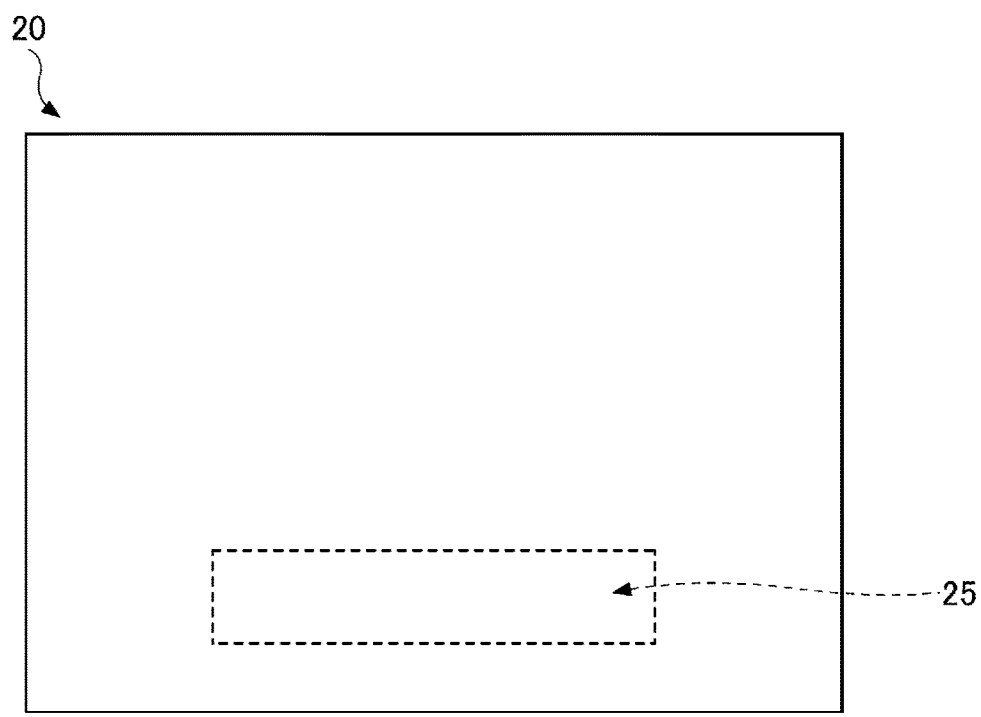

FIGS. 3A and 3B are drawings for explaining preferable arrangements of display devices, and schematically illustrates laminated glass attached to a vehicle, as seen from the inside of the passenger compartment toward the outside of the passenger compartment. In FIG. 3A and FIG. 3B, the top side of the drawing denotes the roof side and the bottom side of the drawing denotes the floor side.

As illustrated in FIG. 3A, in a case where the laminated glass 20 is a windshield or rear window glass, the display device 25 is arranged in such a manner that the longitudinal direction of the display device 25 extends in the vertical direction when the laminated glass 20 is attached to the vehicle. Because a windshield and rear window glass are attached to the vehicle in an inclined state, the arrangement of FIG. 3A can more greatly reduce see-through distortion than the arrangement of FIG. 3B.

Conversely, as illustrated in FIG. 3B, in a case where the laminated glass 20 is a side window glass, the display device 25 is arranged in such a manner that the longitudinal direction of the display device 25 extends in the right-and-left direction when the laminated glass 20 is attached to the vehicle. In a case of a side window glass, a passenger of the vehicle sees it sideways, and accordingly the arrangement of FIG. 3B can more greatly reduce see-through distortion than the arrangement of FIG. 3A.

However, the vertical direction and the right-and-left direction referred to herein do not have to be the vertical direction and the right-and-left direction in a strict sense, and are to be understood as including a case where the display device 25 is arranged diagonally with respect to the vertical direction or the right-and-left direction to such an extent that the effect of making the see-through distortion less noticeable is not impaired.

FIGS. 4A and 4B are drawings for explaining a distance between a connection end portion, i.e., an end portion of a wiring plate electrically connected to a display device, and an end portion of a glass plate, and schematically illustrates laminated glass attached to a vehicle, as seen from the inside of the passenger compartment toward the outside of the passenger compartment.

As explained above, the width W of the interlayer film 233 is preferably equal to or greater than 5 mm. However, as illustrated in FIG. 4A, the display device 25 may be arranged in proximity to the end portion of the glass plates 21 and 22, or as illustrated in FIG. 4B, the display device 25 may be arranged such that a portion of the display device 25 extends out of the end portion of the glass plates 21 and 22. In the cases of FIG. 4A and FIG. 4B, in some portion, the width W of the interlayer film 233 becomes 0 mm.

In a case where the laminated glass 20 is side window glass, the relationship in position between the display device 25 and the glass plates 21 and 22 may be as illustrated in FIG. 3A and FIG. 3B. In this case, with the laminated glass 20 alone, a wiring plate 30 (for example, a flexible printed circuit board) electrically connected to the display device 25 is arranged at a visible position in the plan view of the laminated glass 20, because the entire display device 25 is arranged at a position spaced 5 mm or more away from the outer periphery of the laminated glass 20. However, when the wiring plate 30 is routed outward from the bottom side of the laminated glass 20, the portion around the wiring plate 30 can be hidden by the door panel, and therefore, no problem in terms of appearance occurs after the laminated glass 20 is installed on the vehicle.

Figure 5A:
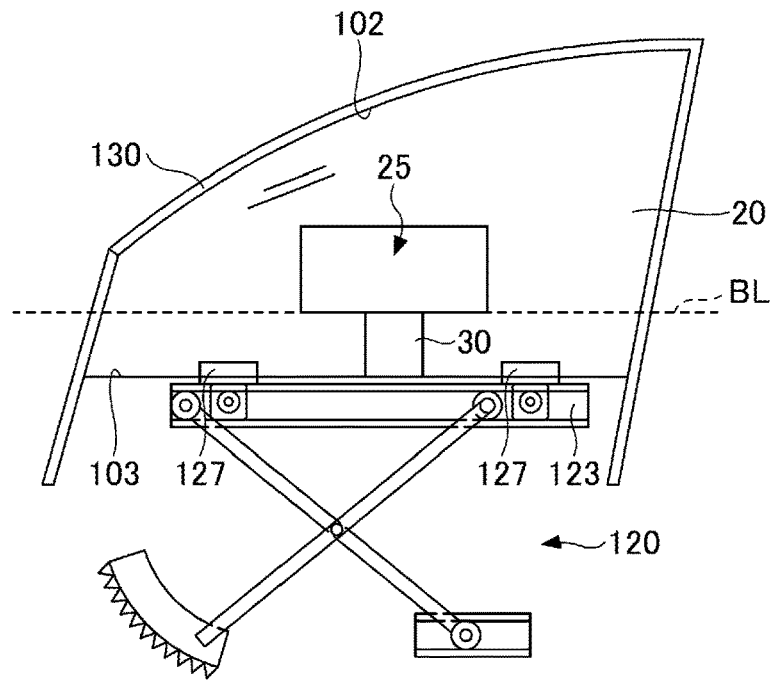
FIGS. 5A and 5B are drawings for explaining shielding of a wiring plate of side window glass.
Figure 5B:
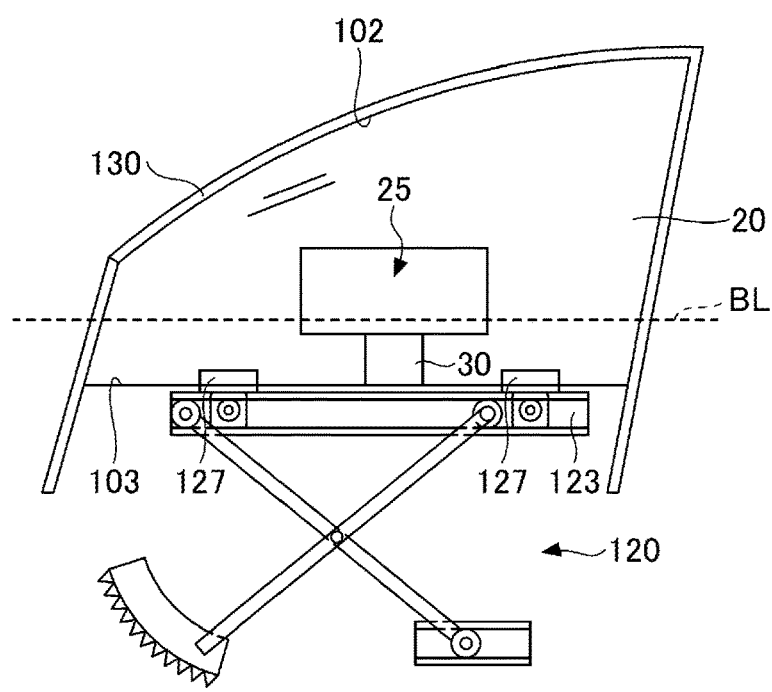

Specifically, as illustrated in FIGS. 5A and 5B, in a case where the laminated glass 20 is a side window glass that can slide in the vertical direction, a window regulator 120 and a holder 127 for sliding the laminated glass 20 up and down along the window frame 130 are provided inside the door panel.

A top side 102 of the laminated glass 20 is a side that is exposed when the side window glass is opened. The holder 127 is attached to a bottom side 103 of the laminated glass 20, and is attached to a lifting rail 123 of the window regulator 120.

Even when the laminated glass 20 (side window glass) is completely closed up to the top, a lower side below a belt line BL of the side window glass (a border between the side window glass and the door panel) is located inside the door panel and is thus not exposed.

Therefore, inside the laminated glass 20, as illustrated in FIG. 5A, even when the entire display device 25 is located at the position 5 mm or more away from the outer periphery of the laminated glass 20, the wiring plate 30 cannot be seen when the laminated glass 20 is installed in the door of the vehicle, even if the wiring plate 30 is routed from the bottom side of the display device 25, as long as the bottom side of the display device 25 is arranged to be located on the belt line BL.

Alternatively, inside the laminated glass 20, as illustrated in FIG. 5B, even when the entire display device 25 is located at the position 5 mm or more away from the outer periphery of the laminated glass 20, the wiring plate 30 cannot be seen when the laminated glass 20 is installed in the door of the vehicle, even if the wiring plate 30 is routed from the bottom side of the display device 25, as long as the bottom side of the display device 25 is arranged to be located below the belt line BL (i.e., located inside the door panel).

In any of the cases of FIG. 5A and FIG. 5B, with the laminated glass 20 alone that has not yet been attached to the vehicle, the wiring plate 30 is arranged at a visible position, but the wiring plate 30 is invisible when the laminated glass 20 is installed in the door of the vehicle, and therefore, does not detract from the appearance.

In a case where the laminated glass 20 is side window glass, if the wiring plate 30 is routed from the bottom side of the laminated glass 20, the wiring plate 30 can be prevented from being entangled with other members when the laminated glass installed in the vehicle slides up and down.

Back to the explanation of FIGS. 4A and 4B, in the cases of FIG. 4A and FIG. 4B, a distance $L_1$ in the plan view between a connection end portion 30e, i.e., an end portion of the wiring plate 30 electrically connected to the display device 25, and an end portion 21e of the glass plate 21 is preferably equal to or greater than 1 mm, and the distance $L_1$ between the connection end portion 30e of the wiring plate 30 and an end portion 22e of the glass plate 22 is preferably equal to or greater than 1 mm.

In the case of FIG. 4A, the connection end portion 30e of the wiring plate 30 is shifted in position toward the interior side of the glass plates 21 and 22 with respect to the end portion 21e of the glass plate 21 and the end portion 22e of the glass plate 22. In the case of FIG. 4B, the connection end portion 30e of the wiring plate 30 is shifted in position toward the outside of the glass plates 21 and 22 with respect to the end portion 21e of the glass plate 21 and the end portion 22e of the glass plate 22. In either of the cases of FIG. 4A and FIG. 4B, when the distance $L_1$ is equal to or greater than 1 mm, wires included in the wiring plate 30 can be prevented from snapping.

Figure 6:
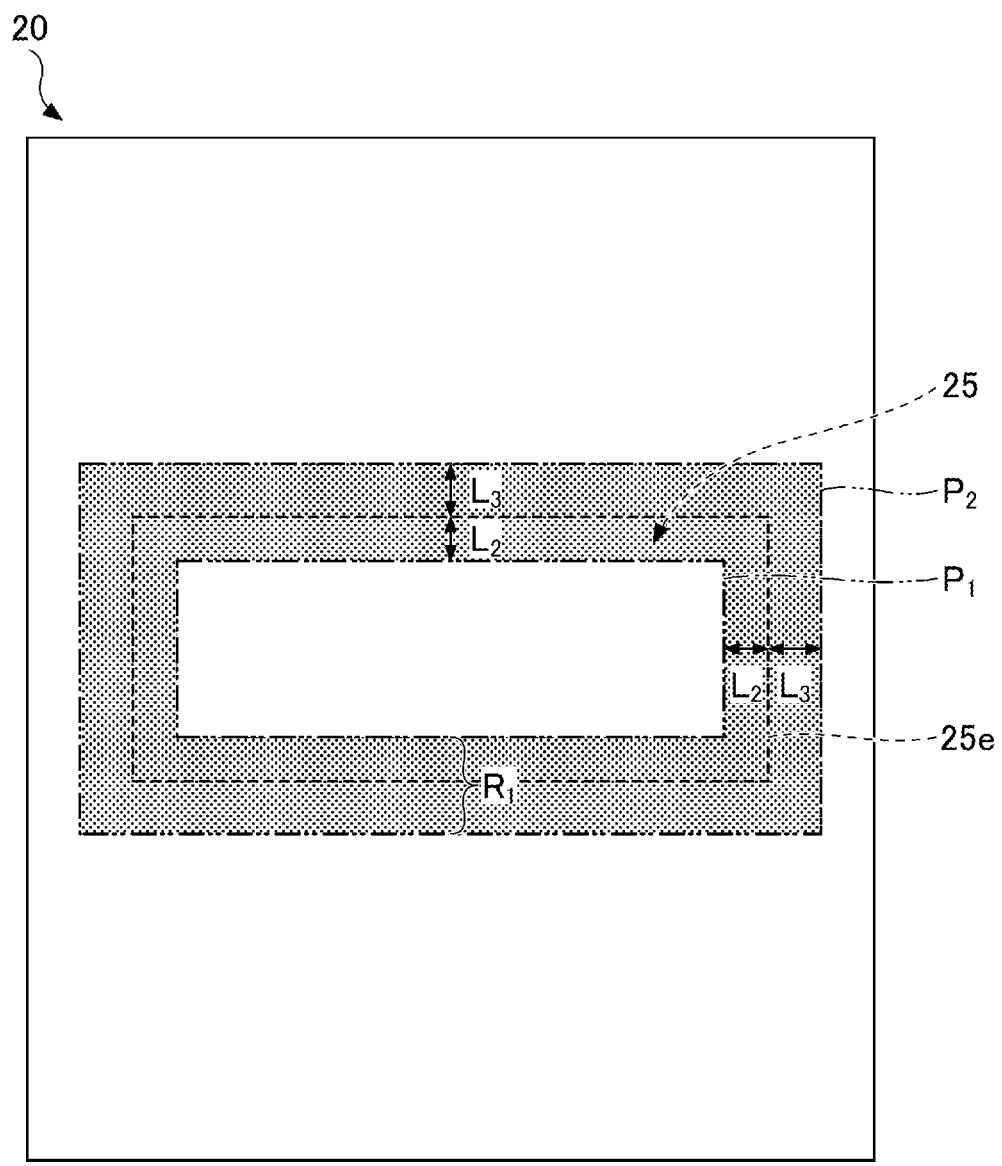
FIG. 6 is a drawing for explaining a total thickness distribution of the laminated glass.

FIG. 6 is a drawing for explaining a total thickness distribution of laminated glass, and schematically illustrates laminated glass attached to a vehicle, as seen from the inside of the passenger compartment toward the outside of the passenger compartment.

In FIG. 6, a long dashed double-short dashed line $P_1$ indicates a position that is 10 mm inside an end portion 25e of the display device 25 in the plan view ($L_2$=10 mm). A long dashed double-short dashed line $P_2$ indicates a position that is 10 mm outside the end portion 25e of the display device 25 in the plan view ($L_3$=10 mm).

In this case, in an area $R_1$ between the position of the long dashed double-short dashed line $P_1$ and the position of the long dashed double-short dashed line $P_2$ (i.e., the area $R_1$ that is ±10 mm from the end portion 25e of the display device 25 in the plan view), a variation in the total thickness of the laminated glass 20 is preferably equal to or less than ±100 μm. Accordingly, the thickness distribution of the laminated glass 20 in proximity to the end portion 25e of the display device 25 is reduced, and accordingly, the see-through distortion in proximity to the end portion 25e of the display device 25 can be substantially prevented from worsening.

From the position of the long dashed double-short dashed line $P_1$ to the position of the long dashed double-short dashed line $P_2$, a variation in the total thickness of the laminated glass 20 is more preferably equal to or less than ±70 μm. Accordingly, the thickness distribution of the laminated glass 20 in proximity to the end portion 25e of the display device 25 is further reduced, and therefore, a worsening of see-through distortion in proximity to the end portion 25e of the display device 25 is even more unlikely to occur.

Figure 7:
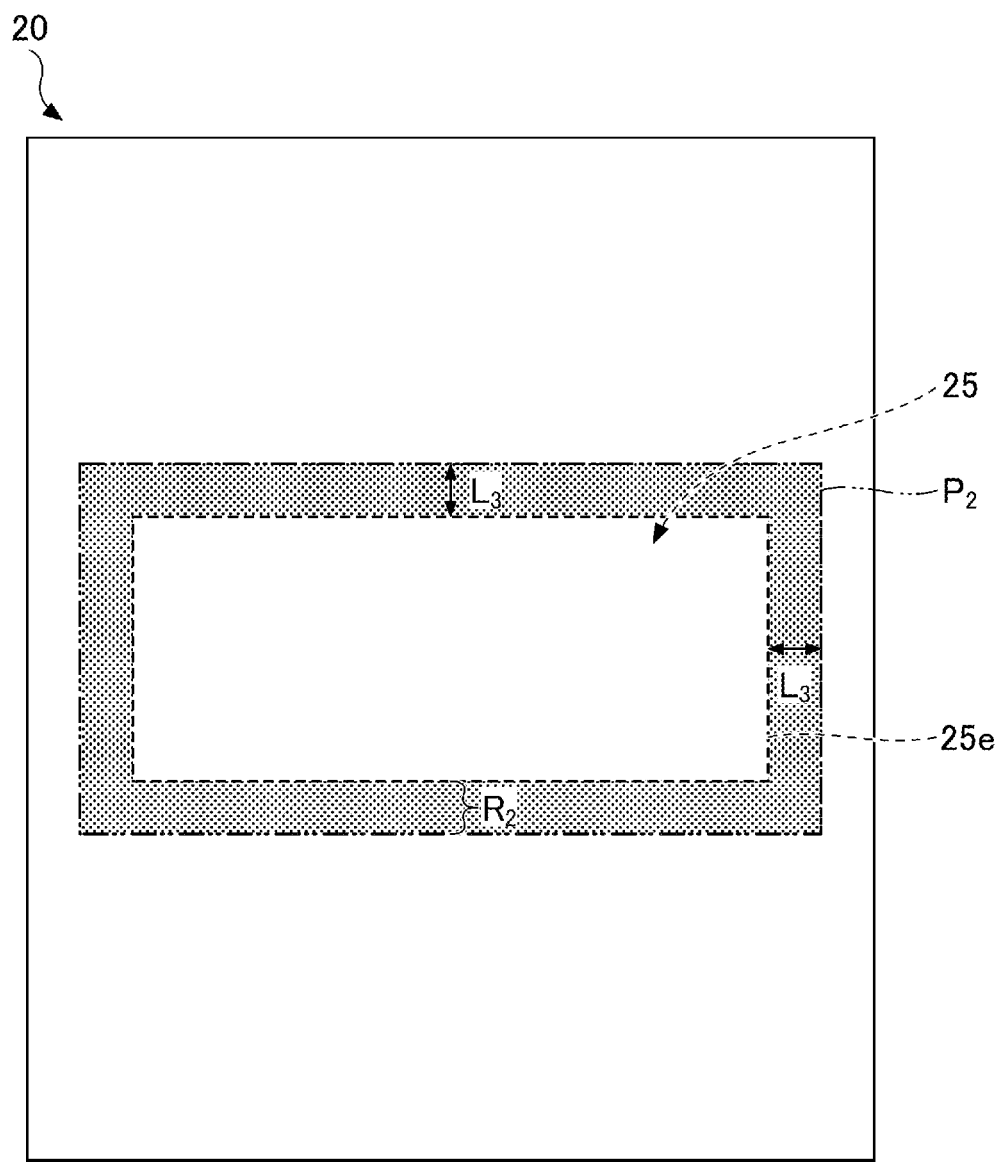
FIG. 7 is a drawing for explaining tensile stress change of the laminated glass.

FIG. 7 is a drawing for explaining tensile stress change of the laminated glass, and schematically illustrates laminated glass attached to a vehicle, as seen from the inside of the passenger compartment toward the outside of the passenger compartment. In FIG. 7, the long dashed double-short dashed line $P_2$ indicates a position that is 10 mm outside the end portion 25e of the display device 25 in the plan view ($L_3$=10 mm).

In this case, in an area $R_2$ between the position of the end portion 25e of the display device 25 and the position of the long dashed double-short dashed line $P_2$ (i.e., the area $R_2$ between the end portion 25e of the display device 25 and the position 10 mm outside thereof in the plan view), the tensile stress change of the laminated glass 20 is preferably equal to or greater than 1 MPa and equal to or smaller than 30 MPa. Accordingly, the risk of breaking the glass plates 21 and 22 and the display device 25 by excessive stress applied thereto can be substantially prevented. The tensile stress change of the laminated glass 20 means tensile stress change that occurs on the vehicle-interior side surface of the glass plate 21 located on the interior side of the laminated glass 20 or the vehicle-exterior side surface of the glass plate 22 located on the exterior side of the laminated glass 20 or both of the surfaces.

Also, in the area $R_2$, the tensile stress change of the laminated glass 20 is more preferably equal to or greater than 1 MPa and equal to or smaller than 20 MPa, and is still more preferably equal to or greater than 1 MPa and equal to or smaller than 10 MPa. When the tensile stress change of the laminated glass 20 is equal to or greater than 1 MPa and equal to or smaller than 20 MPa, or is equal to or greater than 1 MPa and equal to or smaller than 10 MPa, the risk of breaking the glass plates 21 and 22 and the display device 25 can be even more alleviated. The tensile stress change of the laminated glass 20 can be obtained with a surface stress meter using photoelasticity or the like.

Hereinafter, the glass plate 21, the glass plate 22, and the interlayer film 23 are explained in detail.

The glass plates 21 and 22 may be inorganic glass or may be organic glass. The inorganic glass may be, but is not limited to, for example, soda lime glass, aluminosilicate glass, borosilicate glass, alkali-free glass, quartz glass, or the like. Among them, the soda lime glass is particularly preferable in terms of the production cost and the moldability.

The inorganic glass may be either non-tempered glass or tempered glass. The non-tempered glass is obtained by forming molten glass into a plate and annealing it. The tempered glass is formed by forming a compressive stress layer on a surface of non-tempered glass.

The tempered glass may be either a physically tempered glass (for example, heat tempered glass) or a chemically tempered glass. In a case of physically tempered glass, in the bending formation, the glass surface may be tempered by an operation other than slow cooling, such as rapidly cooling a uniformly heated glass plate heated to a temperature at a softening point and thereafter inducing compressive stress on the glass surface by a temperature difference between the glass surface and the inside of the glass.

In a case of chemically tempered glass, the glass surface may be tempered by inducing compressive stress on the glass surface by an ion exchange method or the like after the bending formation. Also, glass that absorbs ultraviolet rays or infrared rays may be used, and further, the glass plate is preferably transparent, but may also be a glass plate that is colored to such an extent that the transparency is not impaired.

Also, examples of materials of organic glass include transparent resins such as polycarbonate, acrylic resin (for example, polymethylmethacrylate), polyvinyl chloride, and polystyrene.

The shapes of the glass plates 21 and 22 are not particularly limited to rectangular shapes, and may be shapes processed into various shapes and curvatures. Gravity formation, press formation, roller formation, and the like are used as bending formation of the glass plates 21 and 22. The method for forming the glass plates 21 and 22 is not particularly limited, but in the case of, for example, inorganic glass, a glass plate formed by float process or the like is preferable.

At the thinnest portion, the plate thickness of the glass plate 22 located outside the laminated glass 20 is equal to or greater than 1.8 mm and equal to or smaller than 3 mm. When the plate thickness of the glass plate 22 is equal to or greater than 1.8 mm, the strength such as a stone chip resistance or the like is sufficient, and when it is equal to or smaller than 3 mm, the weight of the laminated glass does not become excessively heavy, which is preferable in terms of the fuel consumption of the vehicle. At the thinnest portion, the plate thickness of the glass plate 22 is more preferably equal to or greater than 1.8 mm and is equal to or smaller than 2.8 mm, and still more preferably equal to or greater than 1.8 mm and equal to or smaller than 2.6 mm.

The plate thickness of the glass plate 21 located on the inside of the laminated glass 20 is preferably equal to or greater than 0.3 mm and equal to or smaller than 2.3 mm. When the plate thickness of the glass plate 21 is equal to or greater than 0.3 mm, the ease of handling is good, and when it is equal to or smaller than 2.3 mm, the weight does not become excessively heavy.

The glass plate 21 or the glass plates 22 or both do not have to have a constant plate thickness, and as necessary, may have different plate thicknesses depending on the location. For example, in a case where the laminated glass 20 is a windshield, either one of or both of the glass plates 21 and 22 may be in a wedge shape in which the plate thickness increases away from a bottom side toward an top side of the windshield when the windshield is attached to the vehicle. In this case, when the film thickness of the interlayer film 23 is constant, the total wedge angle of the glass plate 21 and the glass plate 22 changes, for example, in a range greater than 0 mrad and equal to or smaller than 1.0 mrad.

A coating for water repellency, ultraviolet ray cut, and infrared ray cut functions, and a coating having low reflection characteristics and low radiation characteristics may be provided on the outside of the glass plate 21 or the glass plates 22 or both. Also, the interior side of the glass plate 21 or the glass plates 22 or both (i.e., a side that is in contact with the interlayer film 23) may have a coating for ultraviolet ray cut, infrared ray cut, low radiation characteristics, visible light absorption, coloring, and the like.

In a case where the glass plates 21 and 22 are inorganic glass, for example, the glass plates 21 and 22 are formed in a float process or the like, and are thereafter bent in a bending process before being bonded with the interlayer film 23. The bending process is performed while the glass is softened with heat. The heating temperature of glass during the bending process is approximately 550 degrees Celsius to 700 degrees Celsius.

Thermoplastic resins are often used as the interlayer film 23 for bonding the glass plate 21 and the glass plate 22. Examples of thermoplastic resins include thermoplastic resins conventionally used for this kind of purpose such as plasticized polyvinyl acetal-based resins, plasticized polyvinyl chloride-based resins, saturated polyester-based resins, plasticized saturated polyester-based resins, polyurethane-based resins, plasticized polyurethane-based resins, ethylene-vinyl acetate copolymer-based resins, ethylene-ethyl acrylate copolymer-based resins, cycloolefin polymer resins, and ionomer resins. A resin composition containing a modified block copolymer hydride described in Japanese Patent No. 6065221 can also be preferably used.

Among them, the plasticized polyvinyl acetal-based resins are preferably used because the plasticized polyvinyl acetal-based resins are excellent in the balance of various performances such as transparency, weather resistance, rigidity, adhesive strength, penetration resistance, impact energy absorption, moisture resistance, heat insulation, and sound insulation. These thermoplastic resins may be used alone or a combination of two or more may be used. "Plasticized" as in "plasticized polyvinyl acetal-based resins" means being plasticized with an addition of a plasticizer. The same applies to other plasticized resins.

However, depending on the type of display device, the display device may be damaged by a certain plasticizer. In that case, it is preferable to use a resin that substantially does not contain any plasticizer. That is, in some cases, it may be preferable that the interlayer film 23 does not contain any plasticizer. Examples of resins that do not contain any plasticizer include ethylene-vinyl acetate copolymer-based resins or the like.

Examples of polyvinyl acetal-based resins include: polyvinyl formal resins obtained by reacting polyvinyl alcohol (which may be hereinafter referred to as "PVA" as necessary) with formaldehyde; a polyvinyl acetal resin in the narrow sense that is obtained by reacting PVA with acetaldehyde; and polyvinyl butyral resins (which may be hereinafter referred to as "PVB" as necessary) obtained by reacting PVA with n-butyraldehyde. In particular, the PVB is preferable because the PVB is excellent in the balance of various performances such as transparency, weather resistance, rigidity, adhesive strength, penetration resistance, impact energy absorption, moisture resistance, heat insulation, and sound insulation. These polyvinyl acetal-based resins may be used alone or a combination of two or more may be used.

However, the material constituting the interlayer film 23 is not limited to thermoplastic resins. Further, the interlayer film 23 may contain functional particles such as an infrared absorber, an ultraviolet absorber, and a luminescent agent. Further, the interlayer film 23 may have a colored portion called a shade band.

It is desirable that the interlayer films 231, 232, and 233 contained in the interlayer film 23 are all made of the same material, but some or all of the interlayer films 231, 232, and 233 may be made of different materials. For example, the materials may be such that the shear modulus of the interlayer film 233 is smaller than the shear moduli of the interlayer films 231, 232. When the shear modulus of the interlayer film 233 is smaller than the shear moduli of the interlayer films 231, 232, the sound insulation property of the laminated glass 20 can be improved. Even when the shear modulus of the interlayer film 231 is smaller than the shear moduli of the interlayer films 232, 233, the sound insulation property of the laminated glass 20 can be improved, and even when the shear modulus of the interlayer film 232 is smaller than the shear moduli of the interlayer films 231, 233, the sound insulation property of the laminated glass 20 can be improved. However, for the adhesiveness with the glass plates 21 and 22, the functional members placed in the laminated glass 20, and the like, the above materials are preferably used for 50% or more of the film thickness of the interlayer film 23.

At the thinnest portion, the film thickness of the interlayer film 23 is preferably equal to or greater than 0.5 mm. When the film thickness of the interlayer film 23 is equal to or greater than 0.5 mm, the penetration resistance required for the windshield becomes sufficient. At the thickest portion, the film thickness of the interlayer film 23 is preferably equal to or smaller than 3 mm. When the maximum value of the film thickness of the interlayer film 23 is equal to or smaller than 3 mm, the weight of the laminated glass does not become excessively large. The maximum value of the film thickness of the interlayer film 23 is more preferably equal to or smaller than 2.8 mm, and is still more preferably equal to or smaller than 2.6 mm.

Similarly with the interlayer films used for the head-up displays, the interlayer film 23 does not have to have a constant film thickness, and the film thickness may change depending on the location as necessary. For example, in a case where the laminated glass 20 is a windshield, the interlayer film 23 may be in a wedge shape in which the film thickness increases away from the bottom side toward the top side of the windshield when the windshield is attached to the vehicle. In this case, when the film thicknesses of the glass plates 21 and 22 are constant, the wedge angle of the interlayer film 23 changes, for example, in a range greater than 0 mrad and equal to or smaller than 1.0 mrad.

The interlayer film 23 may have four or more layers. For example, the interlayer film is formed by four or more layers, the shear modulus of any layer except the layers on both sides is configured to be smaller than the shear moduli of the layers on both sides by adjusting the plasticizer or the like, so that the sound insulation property of the laminated glass 20 can be improved. In this case, the shear moduli of the layers on both sides may be the same or may be different.

For example, in order to produce the interlayer film 23, the resin material to form the interlayer films is appropriately selected from those described above, to which extrusion molding is applied in a heated and melted state by using an extruder. The extrusion conditions such as the extrusion speed of the extruder are uniformly set. Thereafter, for example, the extruded resin film is stretched as needed in order to make a curvature on the top side and the bottom side according to the design of the windshield. As a result, the interlayer film 23 is completed.

In order to produce laminated glass 20, the interlayer film 23 and the display device 25 are sandwiched between the glass plate 21 and the glass plate 22 to make a laminated body, and then, for example, this laminated body is placed in a rubber bag and bonded at a temperature of about 70 to 110 degrees Celsius in vacuum of −65 to −100 kPa. The heating conditions, the temperature conditions, and the stacking method are appropriately selected in view of the properties of the display device 25 so as to avoid damage during lamination, for example.

Further, for example, the laminated glass 20 with a higher durability can be obtained by performing a pressure bonding process for heating and pressurizing it under a condition of 100 to 150 degrees Celsius and a pressure of 0.6 to 1.3 MPa. However, in some cases, this heating and pressing process does not have to be used in order to simplify the process and in view of the characteristics of the materials to be sealed in the laminated glass 20.

It should be noted that not only the interlayer film 23 and the display device 25 but also a film or a device having the functions of electric heating wires, infrared reflection, light emission, power generation, dimming, a touch panel, visible light reflection, scattering, decoration, absorption, and the like may be provided between the glass plate 21 and the glass plate 22, as long as the effects of the present application are not impaired. The above functional film or device may be directly formed on the principal surface of the glass plate 21 and the glass plate 22.

The total thickness of the laminated glass 20 is preferably equal to or greater than 2.8 mm and equal to or less than 10 mm. When the total thickness of the laminated glass 20 is equal to or greater than 2.8 mm, a sufficient rigidity can be ensured. Also, when the total thickness of the laminated glass 20 is equal to or smaller than 10 mm, a sufficient transmittance can be obtained and the haze can be reduced.

On at least one side of the laminated glass 20, the plate misalignment between the glass plate 21 and the glass plate 22 (the amount of shift in position between the end portion of the glass plate 21 and the end portion of the glass plate 22 in the plan view) is preferably equal to or smaller than 1.5 mm, and more preferably equal to or smaller than 1 mm. When the plate misalignment between the glass plate 21 and the glass plate 22 is equal to or smaller than 1.5 mm on at least one side of the laminated glass 20, this is preferable so as not to detract from the appearance. When the plate misalignment between the glass plate 21 and the glass plate 22 is equal to or smaller than 1.0 mm on at least one side of the laminated glass 20, this is still more preferable so as not to detract from the appearance.

Hereinabove, the example of sealing the display device 25 in the interlayer film 23 of the laminated glass 20 has been explained, but the structure sealed in the interlayer film 23 is not limited to the display device. Instead of the display device or in addition to the display device, an illumination device (an LED illumination device, an organic EL illumination device, warning lamps, or the like), a photovoltaic power generation device including (e.g., silicon-based, compound-based, or organic-based) photovoltaic cells, and a dimming device (a suspended particle device (SPD), electrochromic, photochromic, and thermochromic devices, polymer-dispersed liquid crystal (PDLC), guest-host liquid crystal (GHLC), or the like) may be sealed in the interlayer film 23. In other words, in the laminated glass 20, one or more of the display device, the illumination device, the photovoltaic power generation device, and the dimming device may be sealed in the interlayer film 23.

Even in a case where the structure of any one of the display device, the illumination device, the photovoltaic power generation device, and the dimming device is sealed in the interlayer film 23, the cushioning properties of the interlayer films 231 and 232 are improved when the expression (1) is satisfied. For this reason, in the step of producing the laminated glass 20, the lack of deaeration can be substantially prevented (i.e., the exhaustibility of residual air can be improved), and the breakage of the glass plates 21 and 22 and the sealed structure can be substantially prevented. As a result, the laminated glass 20 can be achieved with a high quality. Also, it is preferable to satisfy the expression (2) even in this case where the structure of any one of the above is sealed in the interlayer film 23.

Window glass for a vehicle may be insulated glazing in which the laminated glass 20 and at least one or more glass plates are arranged spaced apart with a spacer interposed therebetween. In a case where window glass for a vehicle is insulated glazing, a hollow layer is provided between the laminated glass 20 and the glass plate. The hollow layer may be filled with dried air, or may be filled with a noble gas such as krypton and argon. The hollow layer may be vacuum. In a case where the hollow layer is vacuum, multiple gap holding members made of metal materials such as stainless steel in the hollow layer area may be arranged between the laminated glass 20 and the glass plate in order to hold the gap between the laminated glass 20 and the glass plate. The spacer may be made of aluminum, or be made of a resin such as polyamide, polypropylene, or the like. In a case where window glass for a vehicle is insulated glazing, the laminated glass 20 may be provided on the vehicle-exterior side, or may be provided on the vehicle-interior side.

EXAMPLES

Hereinafter, Examples are explained, but the present invention is not limited to these Examples.

In Example 1 to Example 18, the interlayer film 23 (the interlayer films 231, 232, and 233) and a substrate made of glass (that is referred to as a sealed substrate 25 for the sake of convenience), serving as a substitute for the display device 25, were sandwiched between the glass plate 21 and the glass plate 22, so that a laminated body was produced. Then, the laminated body was placed in a rubber bag, and bonded at a temperature of about 70 to 110 degrees Celsius in vacuum of −65 to −100 kPa to produce laminated glass. The dimensions and the like of the produced laminated glass were as described in FIG. 8.

Figure 8:
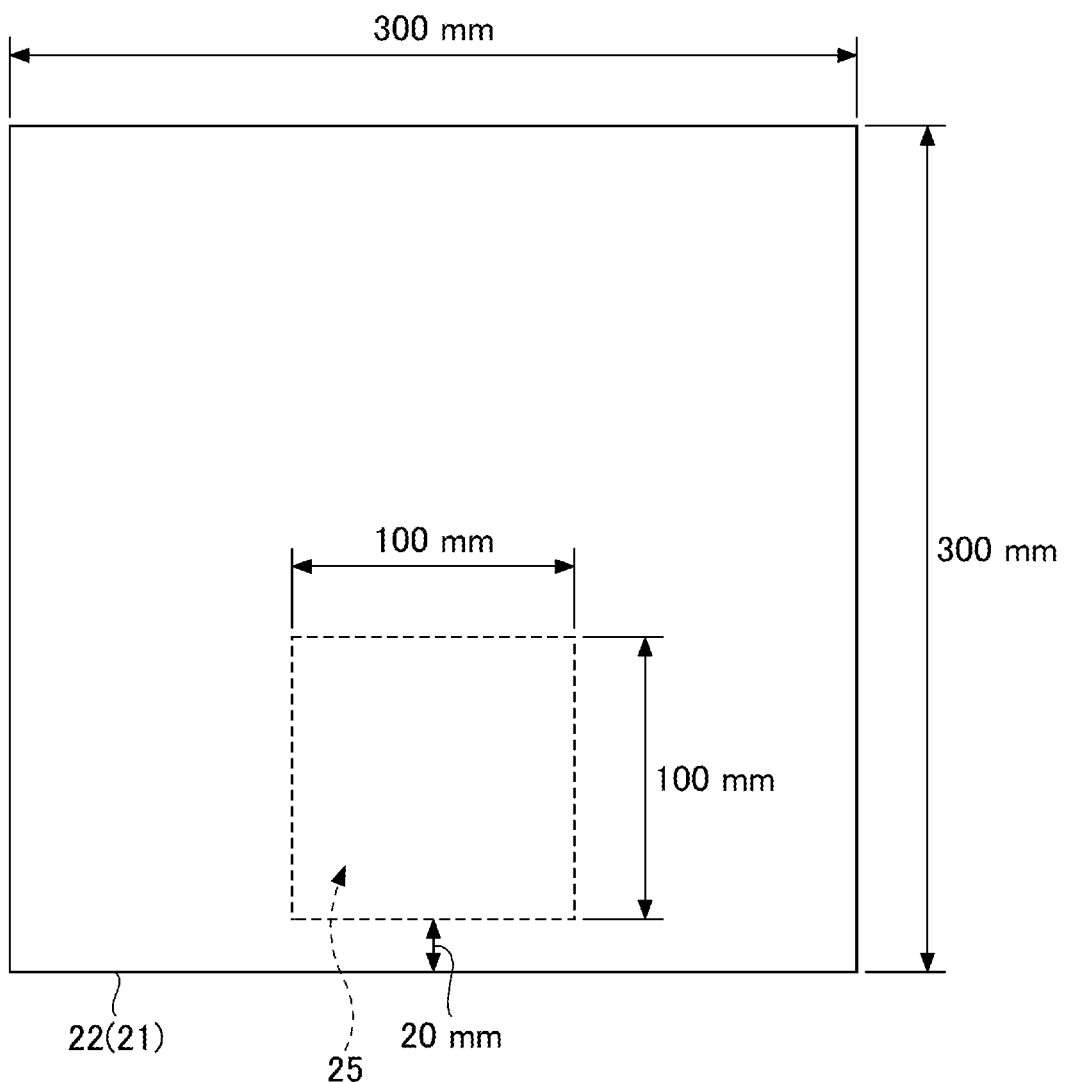
FIG. 8 is a drawing for explaining dimensions of laminated glass produced as Examples.

As illustrated in FIG. 8, the dimensions of the glass plates 21 and 22 were 300 mm×300 mm×a thickness of 2 mm, and the dimensions of the sealed substrate 25 were 100 mm×100 mm. The interlayer film 23 (the interlayer films 231, 232, and 233) and the sealed substrate 25 were sandwiched between the glass plate 21 and the glass plate 22, so that the smallest width of the interlayer film 233 became 20 mm.

As the material for the interlayer films 231, 232, and 233, EVA (Ethylene Vinyl Acetate) was used. The film thicknesses of the interlayer film 231 and the interlayer film 232 were the same (i.e., the film thickness of the interlayer film 231=the film thickness of the interlayer film 232=ti).

In Example 1 to Example 18, breakage and lack of deaeration were evaluated by visual observation by changing the film thicknesses ti of the interlayer films 231 and 232 and the plate thickness ts of the sealed substrate 25. In the evaluation, when neither breakage nor lack of deaeration was found, the Example in question was evaluated as "good", and when at least one of breakage or lack of deaeration was found, the Example in question was evaluated as "poor". Table 1 summarizes the values of the film thicknesses ti of the interlayer films 231 and 232, the values of the plate thickness ts of the sealed substrate 25, and the evaluation results of Example 1 to Example 18.

TABLE 1

|  | Film thickness of interlayer film ti = 0.4 mm | Film thickness of interlayer film ti = 0.8 mm | Film thickness of interlayer film ti = 1.2 mm | Film thickness of interlayer film ti = 1.6 mm |
|---|---|---|---|---|
| Plate thickness of glass plate ts = 0.3 mm | Example 1 Good ti/ts = 1.33 | Example 6 Good ti/ts = 2.67 | Example 12 Good ti/ts = 4.00 | — |
| Plate thickness of glass plate ts = 0.5 mm | Example 2 Good ti/ts = 0.80 | Example 7 Good ti/ts = 1.60 | Example 13 Good ti/ts = 2.40 | — |
| Plate thickness of glass plate ts = 0.7 mm | Example 3 Poor ti/ts = 0.57 | Example 8 Good ti/ts = 1.14 | Example 14 Good ti/ts = 1.71 | — |
| Plate thickness of glass plate ts = 1.1 mm | Example 4 Poor ti/ts = 0.36 | Example 9 Good ti/ts = 0.73 | Example 15 Good ti/ts = 1.09 | — |
| Plate thickness of glass plate ts = 2.0 mm | Example 5 Poor ti/ts = 0.20 | Example 10 Poor tilts = 0.40 | Example 16 Good ti/ts = 0.60 | — |
| Plate thickness of glass plate ts = 2.2 mm | — | Example 11 Poor ti/ts = 0.36 | Example 17 Good ti/ts = 0.55 | Example 18 Good ti/ts = 0.72 |

As shown in Table 1, in a case where ti/ts≥0.6 was satisfied, neither break nor lack of deaeration were found. Conversely, in a case where ti/ts≥0.6 was not satisfied (i.e., a case where ti/ts<0.6 is satisfied), at least one of breakage or lack of deaeration was found.

Specifically, it was found that, in a case where a structure with a relatively high rigidity such as a glass plate is sealed in the interlayer film of the laminated glass, break and lack of deaeration can be substantially prevented when ti/ts≥0.6 is satisfied. The methods for measuring ti and is may be considered to be a laser thickness measurement using light interference or a method of cutting laminated glass and measuring the cross section with a microscope.

The preferred embodiment and the like have been described in detail above. However, the embodiment is not limited to the above-described embodiment and the like, and various modifications and substitutions can be applied to the above-described embodiment and the like without departing from the scope described in claims.

What is claimed is:

1. A curved shaped laminated glass for a vehicle, the laminated glass comprising:
   a vehicle-interior side glass plate;
   a vehicle-exterior side glass plate;
   an interlayer film that bonds the vehicle-interior side glass plate and the vehicle-exterior side glass plate; and
   a display device structure sealed in the interlayer film, wherein
   the display device structure comprising (a) a substrate made of a glass and a display device on the substrate;
   the interlayer film includes:
      a first interlayer film bonded to the vehicle-interior side glass plate;
      a second interlayer film bonded to the vehicle-exterior side glass plate; and
      a third interlayer film located between the first interlayer film and the second interlayer film to enclose an outer periphery of the structure,
   wherein each of the first interlayer film, the second interlayer film and the third interlayer film consisting essentially of ethylene vinyl acetate;
   wherein where a film thickness of the first interlayer film or the second interlayer film, whichever is thinner, is denoted as ti and is from 0.4 mm to 1.6 mm, and a thickness of the substrate of the display device structure is denoted as ts and is from 0.3 mm to 2.2 mm, ti/ts≥0.60 is satisfied, and
   wherein where a flexural modulus of the structure is denoted as $E_1$ [MPa], a relationship between ts in mm and $E_1$ satisfies $E_1 \times ts^3 \geq 500$.

2. The laminated glass according to claim 1, wherein the flexural modulus $E_1$ of the structure is equal to or greater than 100 MPa.

3. The laminated glass according to claim 1, wherein the flexural modulus $E_1$ of the structure is equal to or greater than 1 GPa.

4. The laminated glass according to claim 1, wherein the flexural modulus $E_1$ of the structure is equal to or greater than 10 GPa.

5. The laminated glass according to claim 1, wherein in an area between a position 10 mm inside of an end portion of the structure in a plan view and a position 10 mm outside of the end portion of the structure in the plan view, a variation in a total thickness of the laminated glass is equal to or smaller than ±100 μm.

6. The laminated glass according to claim 1, wherein a width of the third interlayer film is equal to or greater than 5 mm.

7. The laminated glass according to claim 1, wherein the structure includes a wiring plate electrically connected to the structure,
   in a plan view, a distance between a connection end portion of the wiring plate connected to the structure and an end portion of the vehicle-interior side glass plate is equal to or greater than 1 mm, and a distance between the connection end portion and an end portion of the vehicle-exterior side glass plate is equal to or greater than 1 mm.

8. The laminated glass according to claim 7, wherein in a plan view of the laminated glass, the wiring plate is arranged at a position that is visible.

9. The laminated glass according to claim 1, wherein a total thickness of the laminated glass is equal to or greater than 2.8 mm and equal to or smaller than 10 mm.

10. The laminated glass according to claim 1, wherein the display device is selected from the group consisting of a liquid crystal display device, an organic EL display device, an inorganic EL display device and an LED device.

11. The laminated glass according to claim 1, wherein the substrate is a glass substrate.

12. The laminated glass according to claim 11, wherein 4.0≥ti/ts≥0.6.

13. The laminated glass according to claim 1, wherein 4.0≥ti/ts≥0.6.

14. The laminated glass according to claim 11, wherein 4.0≥ti/ts≥0.72.

15. The laminated glass according to claim 1, wherein 4.0≥ti/ts≥0.72.

16. The laminated glass according to claim 1, wherein the vehicle-interior side glass plate has a first non-zero curvature; the vehicle-exterior side glass plate has a second non-zero curvature, which is the same as the first curvature; and the display device structure has a third curvature, which is different from the first curvature and the second curvature.

* * * * *